US012669978B2

(12) United States Patent      (10) Patent No.:   US 12,669,978 B2

Mensa      (45) Date of Patent:    Jun. 30, 2026

(54) METHOD OF INTERACTING WITH AN AUDIO CONTENT CARRIER MEDIUM, A METHOD OF INTERACTING WITH AN AUGMENTED REALITY CARRIER, AN AUDIO CONTENT CARRIER MEDIUM, AND A METHOD OF PLAYING AUDIO CONTENT USING A USER PERIPHERAL

(71) Applicant: Marek Mensa, Dolni Brezany (CZ)

(72) Inventor: Marek Mensa, Dolni Brezany (CZ)

( * ) Notice: Subject to any disclaimer, the term of this patent is extended or adjusted under 35 U.S.C. 154(b) by 260 days.

(21) Appl. No.: 18/565,286

(22) PCT Filed: Jun. 1, 2022

(86) PCT No.: PCT/CZ2022/050054

§ 371 (c)(1),
(2) Date: Nov. 29, 2023

(87) PCT Pub. No.: WO2022/253367

PCT Pub. Date: Dec. 8, 2022

(65) Prior Publication Data

US 2024/0256216 A1     Aug. 1, 2024

(51) Int. Cl.
    *G06F 3/16*        (2006.01)
    *G06F 21/12*      (2013.01)
    *G06F 21/34*      (2013.01)

(52) U.S. Cl.
    CPC ............ *G06F 3/165* (2013.01); *G06F 21/123* (2013.01); *G06F 21/34* (2013.01)

(58) Field of Classification Search
    CPC ........ G06F 40/58; G06F 21/62; G06F 3/0482; G06F 3/01; G06F 17/00; G06F 16/9035;
         (Continued)

(56) References Cited

U.S. PATENT DOCUMENTS 10,347,000 B2    7/2019   Averianov et al.
2004/0220926 A1   11/2004   Lamkin et al.
         (Continued)

FOREIGN PATENT DOCUMENTS

EP       2482210 A2    8/2012

OTHER PUBLICATIONS

Francisco Gutierrez et al: "Application of contextual QR codes to augmented reality technologies", Electronics, Communications and Computing (Conielecomp), 2013 International Conference on, IEEE, Mar. 11, 2013 (Mar. 11, 2013), pp. 264-269, XP032422644, DOI: 10.1109/Conielecomp.2013.6525798 ISBN: 978-1-4673-6156-9.

(Continued)

*Primary Examiner* — Rayeez R Chowdhury

(74) *Attorney, Agent, or Firm* — Thedford I. Hitaffer; Hitaffer, PLLC

(57)           ABSTRACT

A method of interacting with an audio content carrier medium uses a user peripheral, especially a smartphone, tablet, smart glasses, or virtual reality glasses. The carrier medium is used to provide audio content, especially music recordings and tracks, but also provides augmented reality content. The owner of the carrier medium gains dedicated access to both types of content by securing access to each content. Furthermore, a series of innovative user peripheral interactions has augmented reality and audio content.

7 Claims, 3 Drawing Sheets

(58) Field of Classification Search
CPC ...... G06F 21/31; G06F 3/0346; G06F 3/0481;
G06F 16/2457; G06F 16/955; G06F
3/0484; G06F 3/0488; G06F 3/0489;
G06F 3/14; G06F 8/60; G06F 16/95;
G06F 21/10; G06F 21/12; G06F 21/34;
G06F 3/03; G06F 3/042; G06F 3/04842;
G06F 3/16; G06F 21/00; G06F 21/60;
H04L 9/32; H04L 9/08; H04L 9/40;
H04W 12/06; H04W 12/04; H04W 4/40;
H04W 4/80; H04W 12/00; H04W 12/033;
H04W 12/08; H04W 12/082; H04W
12/50; H04W 12/71; H04W 76/10; H04W
76/30
See application file for complete search history.

(56) References Cited

U.S. PATENT DOCUMENTS

| | | | |
|---|---|---|---|
| 2019/0245897 A1* | 8/2019 | Calloway | ........... H04N 21/4223 |
| 2021/0012676 A1 | 1/2021 | Jackson | |
| 2023/0360302 A1* | 11/2023 | Boyles | ................... G06F 3/017 |

OTHER PUBLICATIONS

European Patent Office, International Search Report, dated Oct. 10, 2022, in International Patent Application No. PCT/CZ2022/050054 filed Jun. 1, 2022.
European Patent Office, Written Opinion, dated Oct. 10, 2022, in International Patent Application No. PCT/CZ2022/050054 filed Jun. 1, 2022.

* cited by examiner

METHOD OF INTERACTING WITH AN AUDIO CONTENT CARRIER MEDIUM, A METHOD OF INTERACTING WITH AN AUGMENTED REALITY CARRIER, AN AUDIO CONTENT CARRIER MEDIUM, AND A METHOD OF PLAYING AUDIO CONTENT USING A USER PERIPHERAL

CROSS-REFERENCE TO RELATED APPLICATIONS

This application, filed under 35 USC 371, is a United States National Stage Application of International Application No. PCT/CZ2022/050054, filed Jun. 1, 2022, which claims priority to CZ Application No. CZ 2021-270, filed on Jun. 1, 2021, the disclosures of which are incorporated herein by reference in their entirety.

TECHNICAL FIELD

The invention provides a new type of carrier medium with audio content, in particular music, and a method of interacting with the carrier medium, which is also a carrier for augmented reality content.

BACKGROUND OF THE INVENTION

The distribution of music content to the end user is evolving along with the possibilities of data transmission via different types of data carriers—vinyl records, audio cassettes, CDs, etc. Currently, multimedia content is mainly shared through streaming platforms such as Spotify, YouTube Music, Apple Music, Soundcloud, and many others. This access to music media has been accompanied by a decline in sales of physical music and other audio or multimedia content carriers. The user is not motivated to buy a physical music carrier because there is a significant amount of multimedia content available on their phone. On the other hand, the musician loses the sources of income associated with the sales of physical media carriers. This deprives users of the opportunity to physically collect or, for example, donate music, which was one of the important, though less obvious, reasons for the success of older types of media carriers. This is proven by the fact that vinyl records have been on the rise again for several years. The motivation to physically own and collect music may be one explanation. However, most of the market these days logically uses streaming platforms, partly because they do not own a phonograph to play the records on.

Augmented reality is a new type of transmission and display of multimedia content to the end user, where the user can access virtual graphical content tied to real-world elements using their smartphone, tablet, smart glasses, or augmented reality glasses. In addition, these days, augmented reality can be viewed directly in a web browser without the need for downloading an app, making it instantly accessible to virtually anyone with a smart device. Augmented reality content can be used to enhance a physical object, enhance its attractiveness, increase motivation to own it, and increase user interaction with the owned item. The state of the art thus describes, for example, collector cards using augmented reality to display a 3D model of an otherwise 2D image on the card.

Document U.S. Pat. No. 10,347,000 B2 describes interaction of a user peripheral with an augmented reality carrier, where the carrier is implemented, for example, as a collectible card with graphical content. By interacting with the augmented reality carrier, the user gains access to the augmented reality content, which both displays a 3D model of the content of the card and provides the user with a set of accompanying information relevant to the displayed object and the object of the collector's card.

Ownership of a physical carrier medium, such as a CD or vinyl, gives the user the opportunity to be the sole owner of the specific media content available on the carrier medium. Streaming platforms do not provide this option, so the user does not own the content being played, nor can they associate it with a real, tangible element. However, a physical medium also presents a certain disadvantage in its security, where the mere availability of the media content available on the physical medium is sufficient to access it without the need for access authentication, which in extreme cases can lead to the theft of the physical medium, after which the user loses both the collectible and the media content.

The actual creation of augmented reality content is a lengthy process, often involving routine and repetitive tasks, which greatly complicates and prolongs its creation, especially when augmented reality content is combined with other types of media content. In the vast majority of cases, programming knowledge is required for larger projects.

SUMMARY OF THE INVENTION

The above shortcomings are at least partially eliminated by an innovative method of interacting with an audio content carrier medium using a user peripheral. The user peripheral comprises at least a sensing sensor, a speaker, and a display. The carrier medium is provided with an automated data collection means and a unique carrier medium verification code used to authenticate access to the contents of the medium. The automated data collection means is used to utilize the verification code of the carrier medium. In addition, the user peripheral has access to the verification code of the carrier medium for match verification, authentication, and the option of the peripheral to access the content of the medium. The content of the medium is stored on a remote server that the user can access using a user account consisting of at least a user identifier, name, and password. Advantages are provided by the design of the carrier medium as an augmented reality content carrier, where the augmented reality content and the audio content are in a restricted access mode. Interaction with the carrier medium is performed by placing the carrier medium in the field of view of the sensing sensor, verifying that the identifier of the logged-in user matches one of the identifiers of the users authorized to use a given carrier medium verification code, and then making the audio and augmented reality content fully accessible in the user peripheral in case of a match. In this way, innovative interaction of the user with a new type of carrier medium is ensured using the user peripheral.

Once the match has been verified, the user gains permanent access to the audio content in their peripheral. By gaining access, the user also gets the option to interact with both the audio and the augmented reality content simultaneously, where the audio content is played on the user's peripheral, and the augmented reality content is displayed on it.

The audio content keeps playing even after shifting the field of view of the sensing sensor outside the augmented reality content carrier, and the user remains able to interact with the audio content using the interaction elements available in the peripheral's user interface.

The augmented reality content preferably has at least two types of source data, which differ in the quality and size of the resulting augmented reality content. This solves the problem of the different times required to display the augmented reality content in the interface of a web browser and the interface of a native application or computer program.

Preferably, the display of the augmented reality content is timewise linked to the playback of the audio content. This ensures that the augmented reality content and audio content are continuously intertwined during interaction, especially during shifting of point on the timeline.

Preferably, the verification code is then physically attached to the carrier medium, for example by printing, sticking, or is another physical part of the carrier medium.

Next, a method of interacting with an augmented reality carrier using a user peripheral is disclosed, where the user peripheral comprises at least the sensing sensor, the speaker, and the display. The method of interaction takes place by identifying the augmented reality carrier using the sensing sensor and displaying the augmented reality content. The augmented reality carrier is associated with audio content, which is an audio file or recording, wherein the display of the augmented reality content is accompanied by access to the audio content.

The display of the augmented reality content is simultaneous with the playback of the audio file, thus achieving a new interaction with the carrier medium, which thus provides two types of media content. Audio files can be either provided directly on the carrier medium and transmitted using a wireless communication protocol or stored on a remote server or streaming platform.

When the position of the field of view of the sensing sensor changes relative to the augmented reality carrier, either by movement of the sensor or by movement of the carrier, the audio content is played without interruption. By repeatedly placing the augmented reality carrier in the field of view, the augmented reality content is then repeatedly displayed, which have interconnected time tracks, and by rewinding the audio content, the time position of the augmented reality content is also shifted.

The user interface includes interaction elements that allow typical interaction with the audio content, but in addition allow switching between the playback modes of augmented reality and audio content, where the user can selectively choose to have both contents available or only one content displayed at a time. If the user has access to both types of content, the user can view the augmented reality content without accessing the physical media of the augmented reality content. The user interface also allows content playback in audio and augmented reality content simultaneous playback mode and audio content-only playback mode.

Another technical problem of accessibility to the audio and augmented reality contents is addressed by an innovative audio content carrier medium that comprises an automated data collection means and is implemented as an augmented reality carrier. This carrier medium provides a new type of multimedia platform that delivers audio and augmented reality content only to its owner following authentication of access to that content. The audio content is not necessarily stored in the memory unit of the carrier medium but is also available on remote servers or streaming platforms. However, this content is not available without initial user authentication. This achieves increased security in the distribution of the media content, which also enables the collection of the physical carrier, a phenomenon that has accompanied music for almost centuries.

Another technical problem is solved by a method of playing audio content using the user peripheral with the sensing sensor, speaker, and display. The user peripheral provides several modes of multimedia content playback, where in the first mode, the sensing sensor of the user peripheral is active and the audio content is played simultaneously with the display of the augmented reality content. In contrast, in the second mode, only audio content is played and the sensing sensor is inactive.

The user peripheral, by its user interface, allows the user to interact with the augmented reality content and the audio content in the form of interaction elements, where at least one of the interaction elements allows selective switching between the two modes mentioned.

The two contents have interconnected time tracks, wherein shifting the current time position on the time track shifts not only the audio content, but also the augmented reality content. The user thus interacts with two types of media at the same time. The augmented reality content preferably has at least two types of source data, which differ in the quality and size of the resulting augmented reality content. This solves the problem of the different times required to display the augmented reality content in the interface of a web browser and the interface of a native application or computer program.

DESCRIPTION OF DRAWINGS

A summary of the invention is further clarified using exemplary embodiments thereof, which are described with reference to the accompanying drawings, in which.

EXEMPLARY EMBODIMENTS OF THE INVENTION

The invention will be further clarified using exemplary embodiments with reference to the respective drawings, which, however, have no limiting effect from the point of view of the scope of protection.

Figure 1:
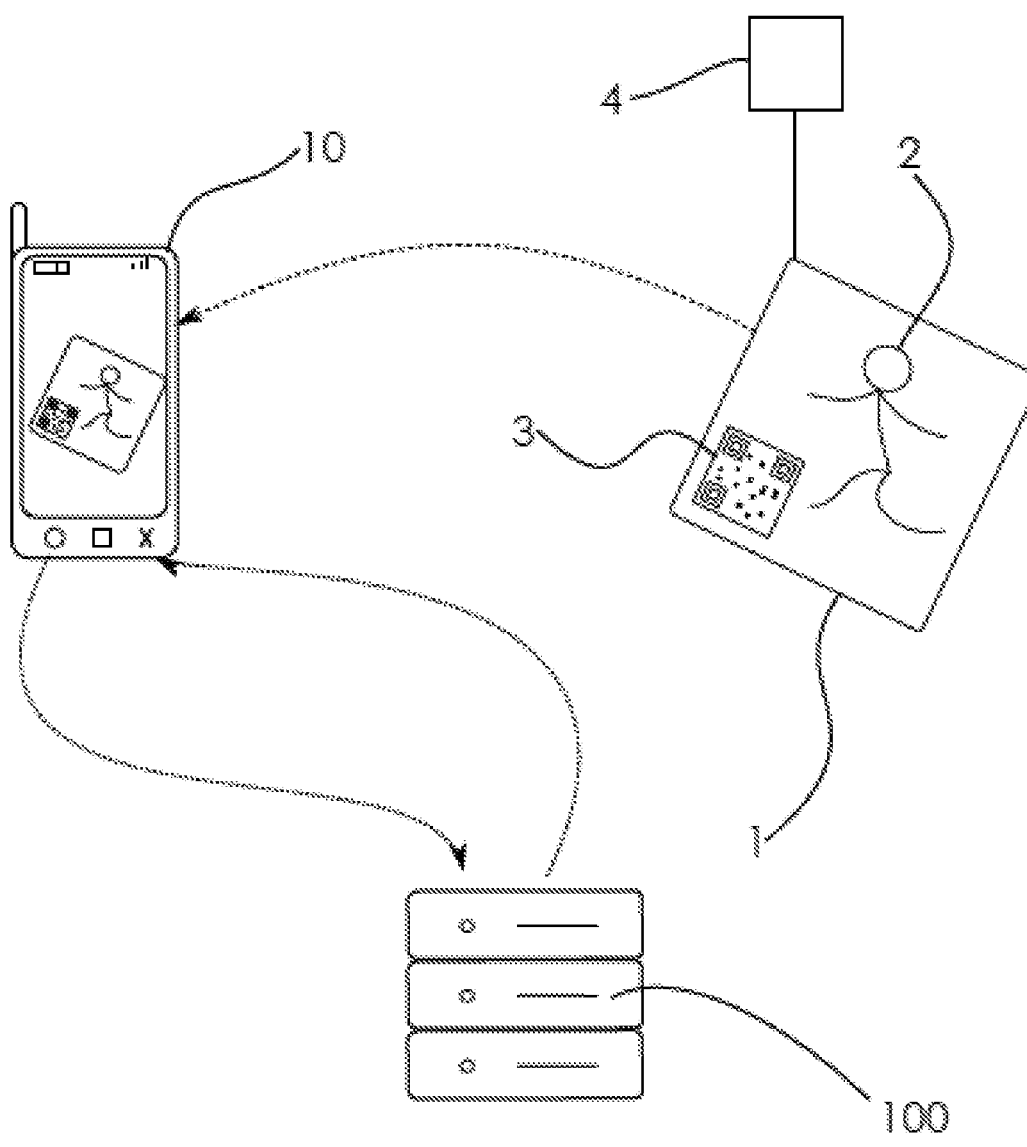
FIG. 1 shows the carrier medium sensed by the user peripheral that is communicatively connected to a remote server.

The first exemplary embodiment of the invention shown in FIG. 1 describes the augmented reality and audio content carrier medium 1. The carrier medium 1 is as an example made as a circular, rectangular, or square or otherwise symmetrical plate of solid material, but the shape is not limiting from the point of view of protection. The key factor influencing the dimensions of the carrier medium 1 is the user comfort during its transfer, the limiting values of the dimensions are depth 0.05-50 mm, width 25-1500 mm, and length 25-1500 mm. The shape of the carrier medium 1 may also be irregular, pierced, perforated, symmetrical, with cut-outs, etc. The carrier medium 1 is made of wood, cardboard, plastic, or other lightweight and rigid material or paper. The carrier medium 1 is provided with at least one graphic element 2, which is usually related to the audio content 4 associated with the carrier medium 1. If the audio content is a music album or track, the graphic element 2 may correspond to the promotional graphics of that album or track. In the case where the audio content 4 is an audiobook, the graphical element 2 may correspond to the cover of a classic book. The carrier medium 1 has printed or otherwise physically attached to it an automated data collection means 3 in the form of a barcode, for example a QR code, an NFC code, an EAN code, or an alternative barcode based on a 2D matrix code. Typically, the automated data collection means 3 is located on the rear side of the carrier medium 1 and the graphic element on the front side, however, the locations may differ. The audio content 4, in particular the audio file or audio recording, is either stored on a remote server 100 or provided by a streaming platform such as Spotify, You-Tube Music, Soundcloud, Apple Music, Amazon Prime Music, etc. The carrier medium 1 typically includes a removable cover 7 made as a protective element of the carrier medium 1. The cover 7 may be provided with a graphic motif identical to the graphic element 2. Another function of the cover 7 is to hide the automated data collection means 3 such that the means 3 is not visible and/or readable when the carrier medium 1 is placed in the cover 7. The carrier medium 1 is further provided with an augmented reality carrier 8. The augmented reality carrier 8 may be the graphic element 2 or other image located on the carrier medium, or the support medium 1 as a whole is made as the augmented reality carrier 8. Augmented reality content 14 is then tied to the augmented reality carrier 8, consisting mostly of one or more augmented reality objects 141 performing certain actions and visual changes. By the augmented reality content 14 is meant all the playable action of the augmented reality, where at a certain moment, for example, emptiness (no object 141) can be defined. The object 141 is then any single visual element of the augmented reality content 14, such as a 3D model, image, text, video, or other.

The automated data collection means 3 stores information used to utilize the carrier medium verification code or the carrier medium verification code itself, wherein the stored information is implemented as alphanumeric text and is unique to each individual carrier medium 1.

The audio content 4 and the augmented reality content 14 are stored in a restricted access mode. Therefore, they cannot be fully viewed, downloaded, listened to, or otherwise interacted with until the user's identity, authentication, and permissions are authenticated. This process will be discussed below.

In an exemplary embodiment of the invention, the carrier medium 1 is interacted with by a user peripheral 10 comprising at least a sensing sensor 11, a speaker 12, a display 13. The user peripheral 10 means in particular a mobile phone 10, smart glasses, tablet, etc. The user peripheral 10 enables connection to the internet via Wifi and mobile networks such as 4G or 5G interfaces. In a user interface in the form of a web page interface, a mobile application interface, a computer program interface, a smart glasses or virtual reality glasses interface, etc., the user is prompted to log in using the login credentials associated with that interface. The user obtains the login credentials by registering in the interface, or it is possible to use third-party logins such as Facebook, Google, and others. The user account is assigned a carrier medium verification code in the form of an alphanumeric text. The user has the option of obtaining the carrier medium verification code by purchasing it in a physical or online store or other web or mobile interface. After purchase, the user can receive the carrier medium verification code in physical form, for example on paper or on a transaction receipt, or in electronic form, where the carrier medium verification code is sent to the user's email account, from where the user assigns it to their user account. Alternatively, the carrier medium verification code can be automatically assigned to a user account immediately after purchase. Alternatively, the verification code is printed on the surface of the cover 7. The carrier medium verification code is used to identify the carrier and to obtain information about the authorization of a specific user or multiple specific users to access the audio content 4 and augmented reality content 14 associated with that carrier. Typically, the carrier medium verification code is part of the information encoded in the automated data collection means. The physical connection to the medium is an important technical aspect as it allows the identification of the physical medium, its purpose, authenticity, and ownership. If the carrier and the verification code were separated, it would be impossible to prove their correlation later.

Figures 2A, 2B, 2C:
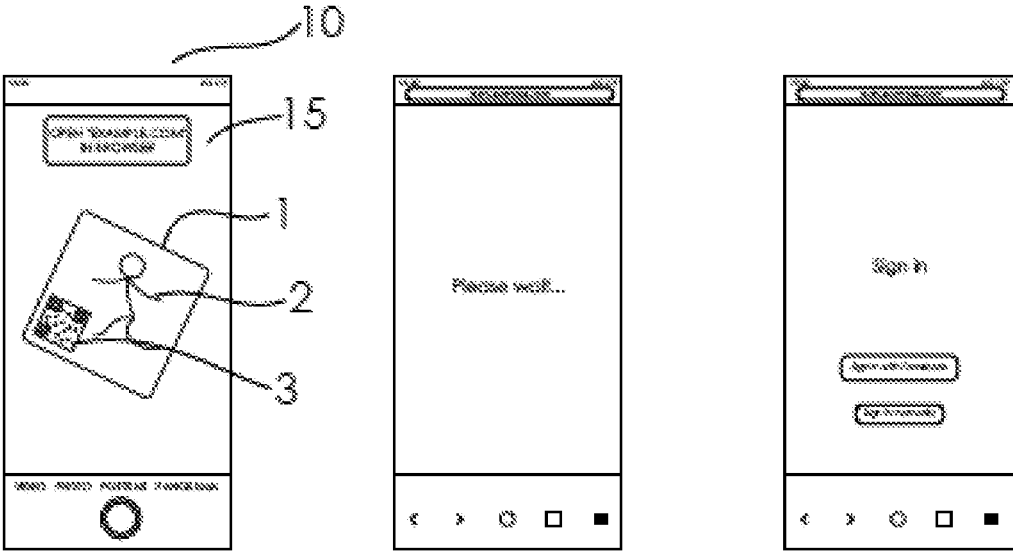
FIG. 2 shows the flow of interaction between the user peripheral and the carrier medium.
Figures 2D, 2E, 2F:
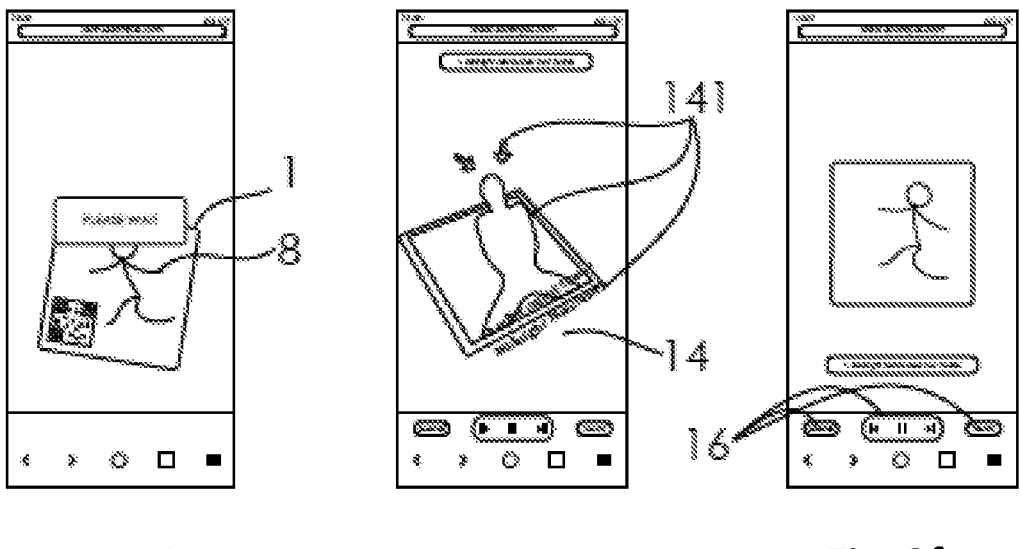
Figure 3:
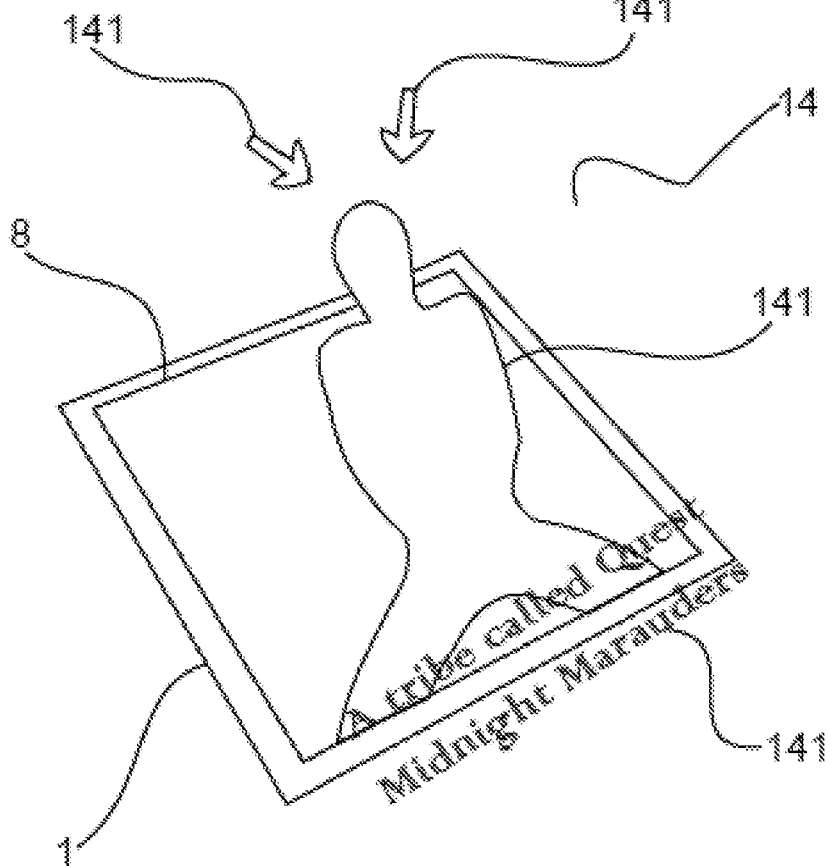
FIG. 3 shows the augmented reality content.

The interaction of the user peripheral 10 with the carrier medium 1 is carried out as follows. The carrier medium verification code is submitted via a web or mobile app interface. It can be submitted in several exemplary methods. In the first exemplary method, the carrier medium 1 is positioned within the field of view of the sensing sensor 11. In FIG. 2*a*, the automated data collection means 3 is read by the sensing sensor 11 and the user of the user peripheral 10 is prompted to confirm the action triggered by the sensing of the automated data collection means 3. This action is either opening the web interface in the web browser of the user peripheral 10 or opening the application in the user peripheral 10, as shown in FIG. 2*b* and FIG. 2*c*. The second exemplary method is to manually enter the carrier medium verification code into the web or mobile application interface. The third exemplary method is to place the carrier medium within the field of view of the sensing sensor, where the sensing sensor is used by the mobile application interface. In this case, the mobile application decodes the content of the automated data collection means via the sensing sensor and further works with it inside the mobile application. Upon submitting the carrier medium verification code, user access is verified, authenticated, and the identifier of the currently logged-in user and the identifiers of users who are authorized to use the carrier medium verification code are compared. In the absence of any matching user identifier, the audio content 4 and augmented reality content 14 remain in a restricted access mode where the audio content 4 cannot be fully played and the augmented reality content 14 cannot be displayed in the user peripheral 10. In the case of a match between the user identifier and one of the identifiers of the authorized users of the carrier, the audio content 4 and the augmented reality content 14 are put into full access mode and made accessible to the user in the user peripheral 10. If the augmented reality carrier 8 does not yet have any identifiers of users authorized to use the carrier medium verification code recorded, or the maximum number of unique identifiers of users authorized to use the carrier medium verification code has not yet been reached, the audio content 4 and the augmented reality content 14 are also put into full access mode and made accessible to the user in the user peripheral 10, and the user's identifier is additionally recorded among the identifiers of user accounts authorized to use the carrier medium verification code. After authentication of the access, the user can play the audio content 4, which is as an example at least one audio file, which is, for example, a computer file or an audio recording in a format, typically flac, mp3, mp4, wav, wme, etc., in particular a music track, a music album, or an audiobook. The user can interact with the audio file using an application or web interface, where interaction means playing or pausing the audio file, moving the audio file in time, and other interactions with the audio file common to audio file players. The interaction is implemented using a graphical user interface 15 that includes interaction elements 16 in the form of icons, buttons, and other interaction elements typical for graphical user interfaces, particularly on touch screen phones. At the same time, the user gets the option to view the augmented reality content 14, where the state and visual appearance of that content is typically tied to the current state of playback of the audio recording. Thus, in this case, the aforementioned interactions with the sound recording also affect the state and form of the augmented reality content 14. The augmented reality content 14 is displayed to the user in the user interface after the user places the augmented reality carrier 8 in the field of view of the sensing sensor 11. When the augmented reality carrier 8 is read by the sensing sensor 11, the display 13 of the user peripheral 10 displays the augmented reality content 14, which is typically displayed in a position relative to the carrier 8. The augmented reality content 14 is displayed continuously for the entire time that the augmented reality carrier 8 is positioned within the field of view of the sensing sensor 11. The user can interact with some augmented reality objects 141, most often by touch or other gestures. At the same time as displaying the augmented reality content 14, the user can still interact with the audio content 4 via the graphical user interface 15. Thus, on the display 13 of the user peripheral 10, both the augmented reality content 14 and the graphical user interface 15 with the interaction elements 16 are simultaneously displayed at the same time, wherein the augmented reality content 14 is displayed and the audio content 4 is played at the same time. At all times when the augmented reality carrier 8 is positioned in the field of view of the sensing sensor 11, the augmented reality content 14 is displayed, even if the relative positions of the augmented reality carrier 8 and the user peripheral 10 are changed. When the relative positions of the augmented reality carrier 8 and the user peripheral 10 are changed such that the augmented reality carrier 8 is outside the field of view of the sensing sensor 11, the audio content 4 is continuously played without interruption, if such functionality is implemented. If the augmented reality content 14 is available through both the web interface and the mobile application, the individual augmented reality objects 141 may have different source data configured. Typically, the source data for the objects 141 intended for the web interface may be of lower quality and size, allowing for faster loading. Full-size source data can be defined for playback by mobile apps. This responsiveness allows the augmented reality content 14 to be adapted to the limitations of web browsers while maintaining the full user experience when played within a mobile app.

The augmented reality content 14 is made by creating, in a computer program interface, an augmented reality scene comprising individual objects 141 and a timeline, on which, among other things, individual actions affecting the augmented reality objects 141 or peripheral 10 on which the augmented reality content 14 is displayed are recorded. By the action affecting the augmented reality object 141 is meant a movement or other visual change to one or more of the augmented reality objects 141, such as rotation, magnification, color change, visibility change, animation, text change, video playback, etc. When the object 141 is a character or animal, the action may be to trigger animation of limb movement, mouth movement mimicking speech, or interaction with other augmented reality objects 141, such as items. By the action affecting the user peripheral 10 is meant, for example, playing a sound effect, triggering a vibration, or vibrating. The timeline comprises an audio recording of the audio content 4, for example, the audio recording of the audio content is a music track. The timeline is typically as long as or possibly longer than the contained audio recording but has a fixed length. The user has the possibility to first define individual actions in the interface of the computer program, e.g., to define the movement of the mouth of the augmented reality object 141 character as an action. The user then assigns the defined actions to keys on the computer keyboard or other external controller connected to the computer. Pressing a specific key is thus linked to the execution of a specific action. Releasing the key can then trigger the next action. Illustratively, for example, the u key is associated with the mouth movement of the augmented reality object 141 character. Pressing the u key then executes the action of opening the mouth of the augmented reality object 141 character, releasing the u key then executes the action of closing the mouth of the augmented reality object 141 character. Another action can be to insert accompanying text, e.g., subtitles. The accompanying text is arranged in blocks that can correspond to individual verses of a song. For example, the s key can be assigned to perform a block switch action. Pressing the s key is then associated with switching the text block from the current one to the next one. The existing content of the timeline may be played, and during this playback, any actions affecting the augmented reality objects 141 placed on the timeline at the appropriate time blocks or points, and possibly the audio recording at the current position of its playback, are typically displayed. By this implementation, it is possible to place actions affecting the augmented reality object 141 on the timeline such that during playback of the timeline, a key press or release of a key causes a record to be made on the timeline at the point in time at which it is at the moment the key is pressed or released. If an action is defined to press only or release only, only one point is recorded on the timeline at the time the key is pressed or released. Configuration of actions is performed either during paused playback without audio recording or simultaneously with the playback of the audio recording. In an exemplary situation, the user has the song text divided into individual blocks, e.g., verses or shorter text sections. They start the audio recording of the audio content 4 and, according to the course of the text and its recitation or singing, presses the s key, to which they have an action for changing the text block assigned. There is no action assigned to the release. When this key is pressed, a point is inserted on the timeline at that time to symbolize the text change action. The user then presses the u key, which has an action associated with it to open the character's mouth and an action associated with its release to close the character's mouth. If they hold the s key for 2 seconds, a section of 2 s is created on the timeline, where the beginning and end of this section symbolize the actions of pressing and releasing the key, i.e., opening and closing the character's mouth. After releasing the s key, the time section is finished. By pressing the u key again, a new time section is created to symbolize the next opening and closing of the character's mouth. Along with this or within a new cycle, the user inserts time sections belonging to specific actions at a given location on the timeline. By repeatedly pressing the u key, the user then enters the time section records in the timeline during which the action being performed is associated with the u key affecting the augmented reality object 141 character. Thus, the user creates a sequence of time sections on the timeline during which a defined action affecting the augmented reality object 141 is performed. Thus, in the illustrative example, the augmented reality object 141 character opens their mouth in accordance with a sequence of time sections created by repeatedly pressing the u key at different time intervals. Similarly, the subtitle text is changed in accordance with the sequence of time points created by repeatedly pressing the s key at different times. Thus, the interface has defined actions the execution of which affects the augmented reality objects 141, and these actions are stored in the timeline.

During playback of the audio content 4, the user can interact with the carrier medium 1 of the audio content by sensing the augmented reality carrier 8 with the sensing sensor 11. Once the audio content 4 and the augmented reality content 14 have been authenticated and made accessible, the user can play and interact with the audio content 4 in the graphical user interface 15. When the augmented reality carrier 8 is within the field of view of the sensing sensor 11, the augmented reality content 14 is displayed to the user on the display 13 typically at a position relative to the augmented reality carrier 8. Alternatively, the augmented reality content 14 may be displayed without the carrier 8, in which case it is positioned at a point within the field of view of the sensing sensor 11 displayed on the display of the user peripheral 10. However, without owning the carrier 8, the user must also go through authentication and access authentication to the given augmented reality content 14. The graphical user interface 15 for interacting with the audio content 4 is processed in such a way as to allow continuous interaction with the audio content 4 at the same time as the augmented reality content 14 is being displayed. The display of the augmented reality content 14 is accompanied by the execution of actions that generally affect the augmented reality objects 141 or the user peripheral 10. The actions performed are bound to the timeline, wherein this timeline is timewise tied to the timeline of the audio content 4. Thus, while the augmented reality content 14 is displayed on the display 13, the augmented reality object 141 is being affected by the actions associated with it, where their execution is defined for a particular time point in which the audio content 4, such as a music track, is also present. Thus, when the augmented reality content 14 is displayed on the display 13 at a time, or on a timeline, for example 0:34, it begins to perform the actions associated with time 0:34 and beyond. When, as part of the interaction with the audio content 4, the user rewinds the audio content 4, or changes the current time position of the player, for example by dragging a finger along the player bar from 0:34 to an earlier or later moment, the time position of the playback of the actions affecting the augmented reality objects 141 is simultaneously shifted and the augmented reality content 14 is displayed in the state it would be in at that moment in a standard playback situation. This state is calculated by the interface after the user defines the target time point for the rewind. Thus, the time point of playback of the audio content 4 is at all times aligned with the time point of the augmented reality content 14 and its played actions. The user interface also allows playback to start in a mode where only audio content is played and the field of view of the sensing sensor 11 with the augmented reality content 14 is no longer shown on the display 13. This mode can typically be chosen during playback of the augmented reality content 14. This mode may be started or switched to manually through interaction with the user interface or when the augmented reality content 14 is currently playing even after the augmented reality carrier 8, if any, is positioned outside the field of view of the sensing sensor 11. In this mode, the user has standard user interface elements common to audio recording playback, such as a pause button, a play or rewind element for the audio file or recording, an element with promotional graphics, an element for skipping to the next track, or elements with information about the recording or author. However, playback of the audio content 4 typically continues uninterrupted when switching modes. When the augmented reality carrier 8, if any, is again placed in the field of view of the sensing sensor

11, the augmented reality content 14 is again displayed on the display 13 at the time point corresponding to the current time point of the audio content. The scope of protection also includes a computer program that allows for self-execution on the user peripheral 10, which is used for the above-described user interaction with audio content 4 and augmented reality content 14.

Alternatively, the carrier medium may be provided with a memory chip 5, a communication unit 6 enabling wireless communication via a BlueTooth interface, and a battery 9. In this embodiment, the audio content 4 together with the identifiers of the authorized users are located in the memory 5 of the carrier medium 1.

INDUSTRIAL APPLICABILITY

The invention can be used as a new type of audio and augmented reality content carrier medium similar to vinyl records, CDs, cassettes and other audio content carrier media. The invention further provides a new method of interacting with audio content using a user peripheral, in particular a mobile phone, tablet, computer, smart glasses, and virtual reality glasses. The invention also presents a new method of creating augmented reality content tied to audio content and a new method of delivering them to the user.

The invention claimed is:

1. A method of interacting with an audio content carrier medium using a user peripheral comprising at least a sensing sensor, a speaker and a display, where the carrier medium is provided with an automated data collection means and a unique carrier medium verification code;

where the automated data collection means stores information unique to each individual carrier medium used to utilize the verification code of the carrier medium, and the automated data collection means is readable by the sensing sensor;

where the user peripheral further has access to the verification code of the carrier medium;

where a remote server stores the audio content, wherein the user has access to the remote server using a user account consisting of at least a username and password; wherein the carrier medium is an augmented reality content carrier, wherein the augmented reality content and audio content are in restricted access mode, wherein the interaction with the carrier medium comprises the steps of:

placing the carrier medium in the field of view of the sensing sensor verifying whether a logged-in user matches one of users authorized to use the given carrier medium verification code and making the audio content and augmented reality content in the user peripheral fully accessible in case of a match.

2. The method of interacting with the audio content carrier medium of claim 1, wherein after the match is verified, the audio content is made permanently accessible in the user peripheral.

3. The method of interacting with the audio content carrier medium of claim 2, wherein after being made fully accessible, the audio content is played on the user peripheral and the augmented reality content is displayed on the display of the user peripheral.

4. The method of interacting with the audio content carrier medium of claim 3, wherein the audio content is played even after shifting the field of view of the sensing sensor away from the augmented reality content carrier, wherein a user interface provides interaction elements allowing interaction with the audio content.

5. The method of interacting with the audio content carrier medium of claim 1, wherein the augmented reality content has at least two types of source data, where the first type of source data is used in displaying the augmented reality content in a web browser, the second type of source data is used in displaying the augmented reality content in an application interface, wherein the first and second types of source data differ in quality and size of the resulting augmented reality content.

6. The method of interacting with the audio content carrier medium of claim 1, wherein the display of the augmented reality content is timewise linked to the playback of the audio content.

7. The method of interacting with the audio content carrier medium of claim 1, wherein in the verification code is physically attached to the carrier medium.

* * * * *